US009630514B2

(12) United States Patent
Ferrel et al.

(10) Patent No.: US 9,630,514 B2
(45) Date of Patent: Apr. 25, 2017

(54) SYSTEM AND METHOD FOR VEHICLE POWER MANAGEMENT

(71) Applicant: FORD GLOBAL TECHNOLOGIES, LLC, Dearborn, MI (US)

(72) Inventors: Mark J. Ferrel, Brighton, MI (US); Matthew Roger DeDona, Northville, MI (US); Louis Paspal, Canton, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/097,506

(22) Filed: Apr. 13, 2016

(65) Prior Publication Data

US 2016/0221457 A1    Aug. 4, 2016

Related U.S. Application Data

(62) Division of application No. 13/354,643, filed on Jan. 20, 2012, now Pat. No. 9,365,115.

(51) Int. Cl.
| | |
|---|---|
| *H02J 7/00* | (2006.01) |
| *H02J 7/16* | (2006.01) |
| *B60L 11/18* | (2006.01) |
| *B60L 1/00* | (2006.01) |
| *B60L 11/14* | (2006.01) |
| *B60L 11/12* | (2006.01) |
| *H02J 7/14* | (2006.01) |

(52) U.S. Cl.
CPC ............. *B60L 11/1814* (2013.01); *B60L 1/00* (2013.01); *B60L 11/1861* (2013.01); *B60L 11/1868* (2013.01); *H02J 7/007* (2013.01); *H02J 7/1423* (2013.01); *B60L 11/123* (2013.01); *B60L 11/14* (2013.01); *H02J 7/1469* (2013.01); *Y02T 10/7005* (2013.01)

(58) Field of Classification Search
USPC ....... 320/103, 104, 109, 128, 101, 116, 119, 320/126, 125, 127, 137, 166, 132, 133, 320/134, 136; 307/10.7, 10, 7, 64, 11, 307/149, 65, 66, 9.1, 10.1
See application file for complete search history.

(56) References Cited

U.S. PATENT DOCUMENTS

| | | | |
|---|---|---|---|
| 5,650,710 A | 7/1997 | Hotta | |
| 6,404,163 B1 * | 6/2002 | Kapsokavathis | ..... H02J 7/0029 320/104 |
| 8,120,308 B2 * | 2/2012 | Ward | ...................... B60L 8/003 180/2.1 |

(Continued)

Primary Examiner — Alexis A Boateng
(74) Attorney, Agent, or Firm — David B. Kelley; Brooks Kushman P.C.

(57) ABSTRACT

A power management system for a vehicle having wheels and an electric machine operable to provide torque to drive at least one of the wheels includes a first energy storage system capable of supplying power to operate the electric machine. The system also includes a second energy storage system capable of supplying power directly to at least one vehicle load at a lower voltage than the first energy storage system. A voltage conversion device is operable to reduce a voltage of the power supplied by the first energy storage system to the lower voltage to charge the second energy storage system when the vehicle is in a key-off state.

16 Claims, 2 Drawing Sheets

(56) References Cited

U.S. PATENT DOCUMENTS

| | | | |
|---|---|---|---|
| 8,390,145 B2* | 3/2013 | Harding | B60R 16/033 307/10.1 |
| 8,534,400 B2 | 9/2013 | Stanek et al. | |
| 2001/0019224 A1* | 9/2001 | Amano | B60L 11/14 307/10.7 |
| 2002/0014879 A1* | 2/2002 | Koike | H02J 7/0075 320/133 |
| 2003/0210014 A1* | 11/2003 | Jabaji | H02J 7/0031 320/104 |
| 2007/0140670 A1 | 6/2007 | DeDona et al. | |
| 2007/0222413 A1* | 9/2007 | Kinoshita | B60L 11/1868 320/104 |
| 2008/0042615 A1 | 2/2008 | Serrels et al. | |
| 2008/0067974 A1 | 3/2008 | Zhang et al. | |
| 2008/0203966 A1 | 8/2008 | Ward | |
| 2009/0015193 A1* | 1/2009 | Esaka | B60K 6/28 320/103 |
| 2009/0230922 A1 | 9/2009 | Elder et al. | |
| 2010/0204859 A1 | 8/2010 | Kamaga | |
| 2011/0227534 A1* | 9/2011 | Mitsutani | B60K 6/445 320/109 |
| 2012/0007546 A1 | 1/2012 | Eager et al. | |
| 2012/0056478 A1* | 3/2012 | Omoto | B60L 3/0046 307/11 |
| 2012/0068663 A1 | 3/2012 | Tanikawa et al. | |
| 2012/0081070 A1 | 4/2012 | Wook et al. | |
| 2012/0280646 A1* | 11/2012 | Gale | H02J 7/04 320/104 |
| 2013/0127400 A1* | 5/2013 | Oh | B60L 11/14 320/104 |

* cited by examiner

SYSTEM AND METHOD FOR VEHICLE POWER MANAGEMENT

CROSS-REFERENCE TO RELATED APPLICATIONS

This application is a division of U.S. application Ser. No. 13/354,643 filed Jan. 20, 2012, now pending, the disclosure of which is hereby incorporated in its entirety by reference herein.

TECHNICAL FIELD

The present invention relates to a system and method for vehicle power management.

BACKGROUND

Increasingly, vehicles are being powered by an electric motor, either exclusively, or in conjunction with another power source, such as an internal combustion engine. In such vehicles, a high-voltage electrical power source—e.g., a high-voltage battery—is used to power the electric motor and other high voltage loads within the vehicle. In addition to the high voltage battery, a hybrid electric or electric vehicle may also have a low-voltage battery, which may be used to power vehicle lighting, engine cooling fans, heated seats, and/or other low-voltage loads. It may be necessary to provide power to some of the low-voltage loads when the vehicle is not operating—i.e., when the vehicle is in a "key-off" state.

In order to maintain the low-voltage electrical loads during the key-off state, it is necessary to provide a low-voltage power source having an appropriate capacity. The greater the level of the low-voltage loads, and the longer it is desired to maintain those loads, the greater the required capacity of the low-voltage power source. For example, it may be desirable to supply power to the key-off low-voltage loads for several weeks while the vehicle is idle and not being driven. In such a case, the capacity of the low-voltage power source must be relatively high.

Because there is generally a relationship between the capacity of a battery and its physical dimensions, packaging a low-voltage battery of an appropriate capacity can be problematic. In particular, the under-hood compartments of vehicles today, which are already closely packed, may not have the space necessary to accommodate a low-voltage battery. Therefore, it may be necessary to choose alternative locations for the battery. This can undesirably increase the complexity of the wiring within the vehicle, as well as vehicle cost. Therefore, it would be desirable to be able to supply power to low-voltage key-off vehicle loads for a desired amount of time, while keeping the size of the low-voltage power source small enough to be located under the hood or within close proximity thereof.

SUMMARY

Embodiments of the invention include a power management system for a vehicle having wheels and an electric machine operable to provide torque to drive at least one of the wheels. The power management system includes a first energy storage system capable of supplying power to operate the electric machine. A second energy storage system is capable of supplying power directly to at least one vehicle load at a lower voltage than the first energy storage system. A voltage conversion device is operable to reduce a voltage of the power supplied by the first energy storage system to the lower voltage to charge the second energy storage system when the vehicle is in a key-off state.

Embodiments of the invention also include a power management system for a vehicle having wheels and an electric machine operable to provide torque to drive at least one of the wheels. The power management system includes a high voltage battery for supplying power to operate the electric machine. A low-voltage battery is operable to supply power to at least one vehicle load, and a converter is operable to reduce the voltage of power received from the high voltage battery and charge the low-voltage battery when the vehicle is in a key-off state.

Embodiments of the invention further include a method of power management for a vehicle having wheels and an electric machine operable to provide torque to drive at least one of the wheels. The vehicle also includes a high voltage battery for providing power to the electric machine, and a low-voltage battery. The method includes reducing the voltage of the power from the high voltage battery during a vehicle key-off state, and charging the low-voltage battery with the reduced voltage power.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
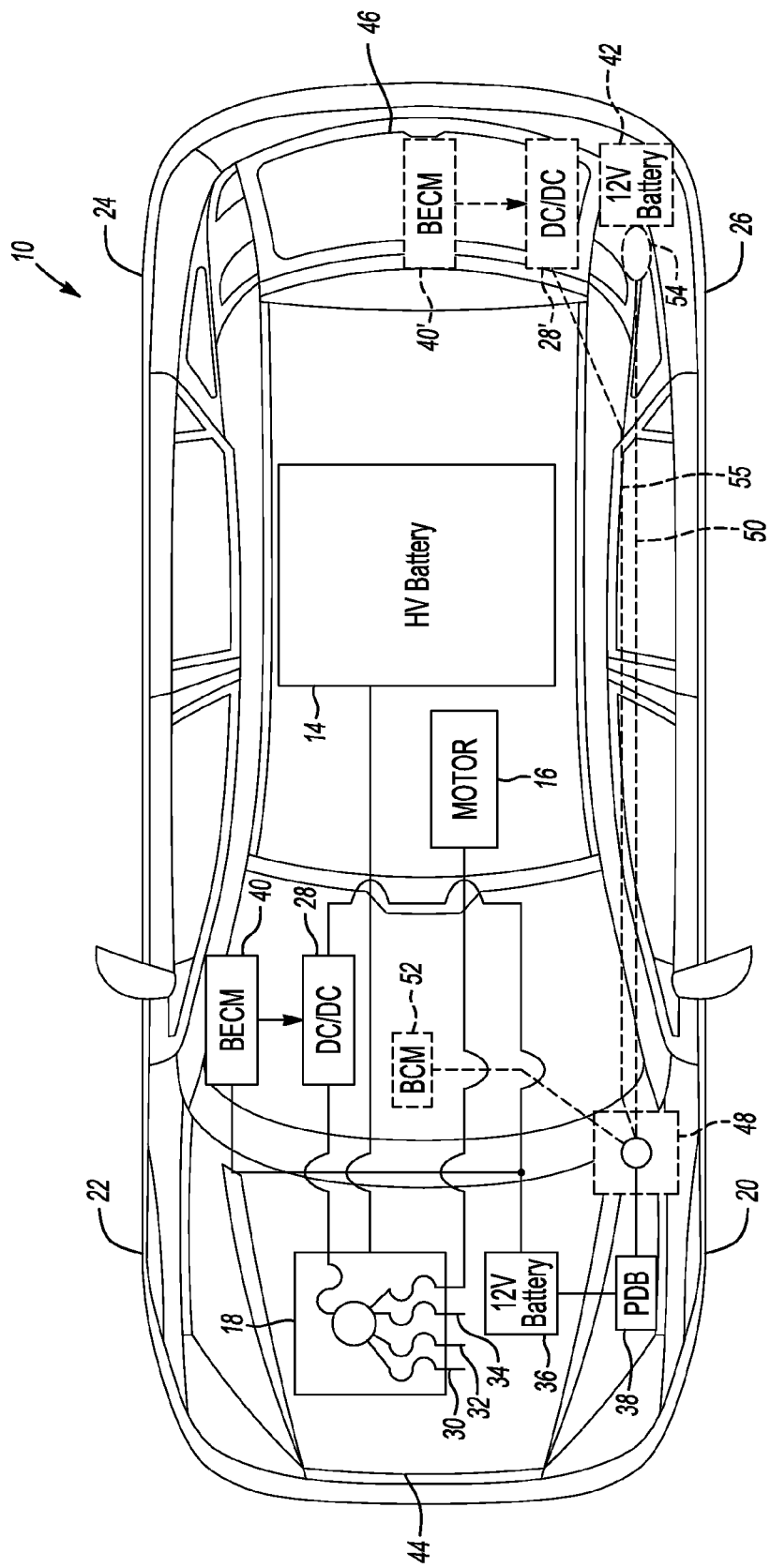
FIG. 1 is a partially schematic view of a vehicle including a power management system in accordance with embodiments of the present invention.

FIG. 1 shows the vehicle 10 having a system 12 (see FIG. 2) in accordance with embodiments of the present invention. The system 12 includes a first energy storage system, which in the embodiment shown in FIG. 1, is a high-voltage battery 14. The HV battery 14 is operable to supply high-voltage power to an electric machine 16. The electric machine 16 is shown as a "motor", but may be, for example, a combination motor/generator. The motor 16 receives power from the battery through a high current fuse box (HCFB) 18, and provides torque to drive one or more pairs of vehicle wheels 20, 22, 24, 26. Through the HCFB 18, the HV battery 14 also provides power to a voltage conversion device, or DC/DC converter 28, and various other high-voltage loads through outputs 30, 32, 34.

The converter 28 reduces the voltage of the high-voltage power supplied by the HV battery 14, and provides a low-voltage output, for example, to a second energy storage system, such as a low-voltage battery 36. As used herein, the distinction between high voltage power and low-voltage power is the difference between voltages in the range of 50 volts or less for low-voltage power, and 100 volts or more for high voltage power. Output from the converter 28 can be used to charge the LV battery 36. As explained in more detail below, this allows the system 12 to use the HV battery 14 to keep the LV battery 36 charged during extended periods of vehicle key-off. The LV battery 36 is capable of supplying power to at least one low-voltage vehicle load, for example, through a fuse box, such as the power distribution box (PDB) 38, for distribution to one or low-voltage loads.

The system 12 also includes a control system, which is shown in the embodiment in FIG. 1 as a battery electronics control module (BECM) 40. Although it is shown as a single controller, the BECM 36 can be part of a larger control system, connected to other controllers, for example, through a controller area network (CAN). The BECM 36 helps to control the converter 28, and therefore, charging of the LV battery 36 by the converter 28.

FIG. 1 also shows a number of components and their possible locations in the vehicle 10 if a system such as the system 12 is not used. For example, as explained above it is possible to charge the LV battery 36 with the converter 28, which steps down the voltage of power supplied by the HV battery 14. This means that a low-voltage battery, such as the LV battery 36, can have a lower capacity than a battery which cannot be charged by an onboard HV battery. In order to maintain several weeks of power to supply key-off low-voltage loads, a low-voltage battery 42 of higher capacity than LV battery 36 may need to be employed. Because it has a higher capacity, the battery 42 may be significantly larger than the LV battery 36. Therefore, it may not be possible to locate the battery 42 in a desired location such as under the hood 44, but rather, it may be necessary to locate it in another available space, such as trunk space 46.

Locating a battery, such as the battery 42 in the trunk 46 presents a number of problems, including an increase in complexity of the electrical system and cost of the vehicle. One problem is that vehicle operators will still require the ability to access their low-voltage battery to use the battery to jumpstart another vehicle. When the battery is located in the trunk 46, a positive battery post 48 must be added near the front of the vehicle such that it is accessible under the hood 44. This requires long and expensive conducting wires 50 to be run from the front of the vehicle 10 to the trunk 46 to connect with the battery 42. In addition, a body control module (BCM) 52, which acts like a "smart junction box" and may be required to connect low-voltage loads to the battery 42. A current sensor 54 is attached to the battery 42 for monitoring the current output of the battery 42. Another downside of having the low-voltage battery 42 located in the trunk 46, is that the BECM 40 (shown as BECM 40') and the converter 28 (shown as converter 28') may also need to be located in the trunk 46 near the battery 42, further requiring additional electrical cabling 55.

Figure 2:
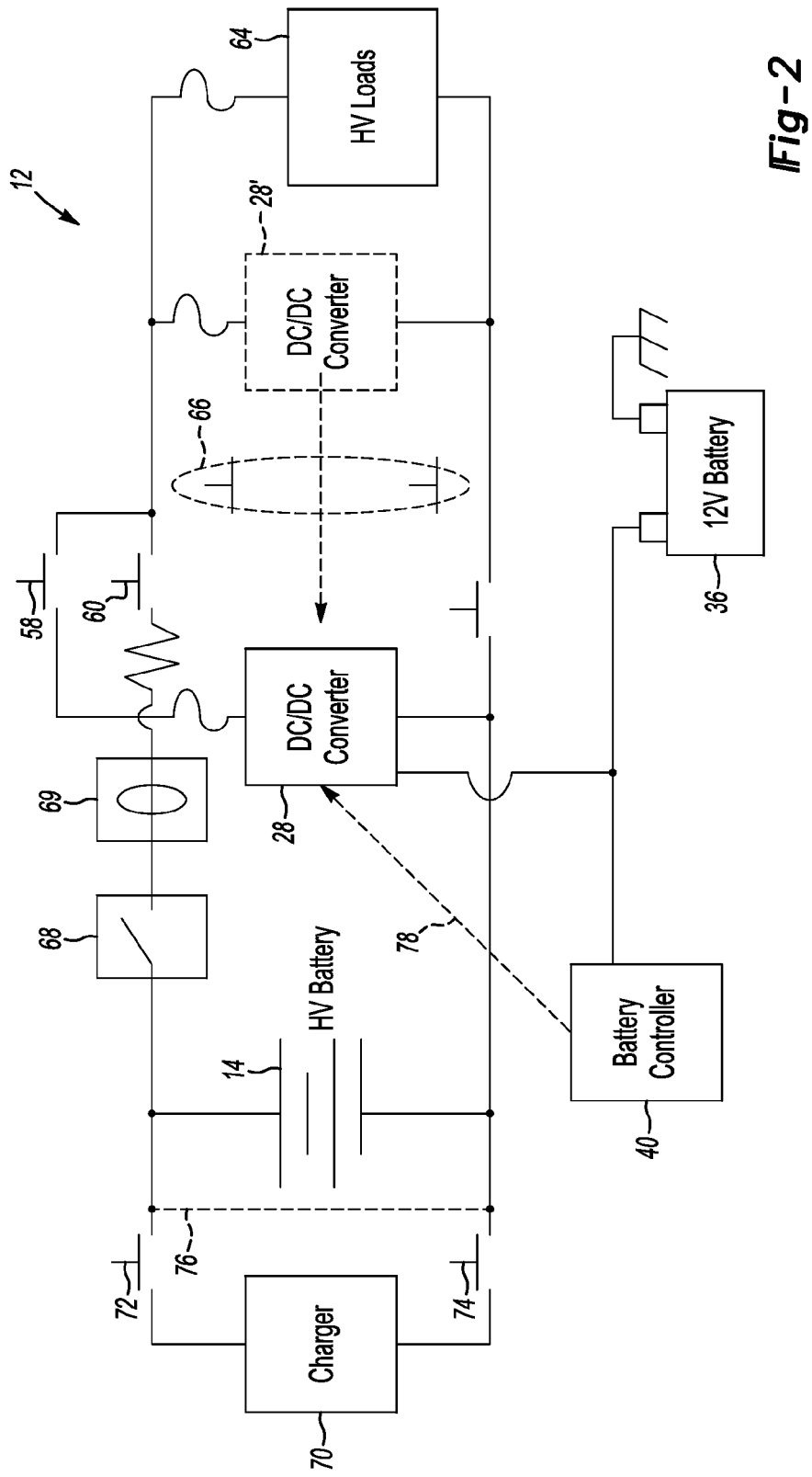
FIG. 2 is an electrical schematic illustrating in detail the power management system shown in FIG. 1.

FIG. 2 shows a schematic representation of the system 12. In particular, it shows the location of the converter 28 pursuant to embodiments of the present invention, and also the location of the converter 28' without implementation of the present invention. As shown in FIG. 2, high-voltage contactors 58, 60, 62 are disposed between the HV battery 14 and the converter 28'. The contactors 58, 60, 62 are the main system contactors, which allow the HV battery 14 to supply power to high-voltage loads 64, which represent any number of high-voltage vehicle loads, including the load of the traction motor 16. Contactors 58, 60 are positive contactors, and contactor 62 is a negative contactor, and each of these contactors is open when the vehicle 10 is in the key-off state. This means that the converter 28' does not receive a supply of high-voltage power and cannot charge the LV battery 36 during a key-off state.

Conversely, with the configuration of the present invention, the converter 28' is moved to a position on the other side of the contactors 58, 60, 62—see converter 28—toward the HV battery 14. This allows the converter 28 to receive high-voltage power directly from the HV battery 14 without the need to close the main system contactors 58, 60, 62. As an alternative, the converter, such as the converter 28' could be connected to a separate set of contactors, shown in phantom as contactors 66, which would allow the converter 28' to be connected to the HV battery 14 without the need to close the main system contactors 58, 60, 62.

Another advantage to moving a converter, such as the converter 28, to the to the HV battery side of the main contactors, is that a vehicle, such as the vehicle 10, can be started in situations where it would not otherwise be possible. For example, if a low-voltage battery, such as the LV battery 36, has a failed cell or cells, its voltage output may be substantially below its nominal voltage rating—e.g., 12 volts. If the voltage available from a LV battery is too low, it may not be enough to start the vehicle. Specifically, the low voltage power supply may not be able to close the main system contactors, which is necessary to facilitate high voltage power supply to a motor, such as the motor 16.

With embodiments of the present invention, a converter, such as the converter 28, can operate in a key-off state as described above, and can also operate as soon as the vehicle is in a "key-on" state—i.e., as soon as the vehicle operator has turned the ignition to "on". In this way, high-voltage power is stepped-down by the converter and supplied to the low-voltage loads; the main system contactors can then be closed and the vehicle started, even though the low voltage battery could not supply the required power. The same is true even if a low voltage battery was completely drained and was unable to hold the charge it received from the high voltage battery during the key-off state.

In addition to the elements that are also shown in FIG. 1, FIG. 2 shows a service disconnect 68, which can be used to open the circuit between the HV battery 14 and the converter 28 in case the converter 28 requires service. Such a disconnect may be particularly important when the converter 28 is located on the battery side of the main system contactors 58, 60, 62. A current sensor 69 is also shown as part of the circuit, and can be used, for example, to provide information to the BECM or battery controller 40.

In the embodiment shown in FIG. 2, the vehicle 10 is a plug-in hybrid electric vehicle (PHEV), and includes a charger 70 that is configured to receive power from a source external to the vehicle 10 to charge the HV battery 14. Contactors 72, 74 are configured to close upon the occurrence of certain events, such as the connection of an external power source to the charger 70. The dashed line 76 shows an alternative configuration for a non-plug-in hybrid vehicle, which does not include an external charger, such as the charger 70. As noted above, it is desirable to be able to charge a low-voltage battery such as the LV battery 36 during key-off periods so that the low-voltage battery can have a reduced capacity and a smaller package size. This may be particularly important in a PHEV, because use of a charger, such as the charger 70 may actually drain a low-voltage battery, such as the LV battery 36, at the same time it charges the HV battery 14.

In situations where charging a PHEV through an external charger, such as the charger 70, drains a low-voltage battery, even a low-voltage battery of relatively high-capacity, and therefore an inconveniently large size, may not be able to maintain the required key-off loads for the required period of time. Therefore, it has been common in such cases to include a small DC/DC converter within the external charger itself. This allows a reduction of the voltage of some of the power provided by the external power source so that the low-voltage battery could be charged at the same time the high-voltage battery was charged. Having a second converter, even a small one within an external charger, adds complexity and cost to the vehicle. Therefore, with embodiments of the present invention, a charger, such as the charger 70, can be "converterless"—i.e., it can be a relatively simple device with no internal DC/DC converter.

In the system 12 shown in FIG. 2, the battery controller 40 is configured to activate the converter 28 to charge the LV battery 36 during the vehicle key-off state, upon the occurrence of at least one predetermined event. For example, the controller 40 may be configured to activate the converter 28 to charge the LV battery 36 at some predetermined frequency during the key-off state. Thus, the "predetermined event" for charging the LV battery 36 could be the passing of some predetermined amount of time (the frequency interval) since the last time the LV battery 36 was charged during the same key-off state.

Another event that could constitute a "predetermined event" and trigger the activation of the converter 28 to charge the LV battery 36 is the state of charge (SOC) of the LV battery 36 dropping below some predetermined level. In at least some embodiments, the controller 40 could monitor the state of charge of the LV battery 36, for example, at some predetermined frequency during the key-off state, and then activate the converter 28 to charge the LV battery 36 when the SOC has dropped below the predetermined charge level. As shown by the dashed line 78, the controller 40 is in direct communication with the converter 28, and can provide signals to activate and control the converter 28. In embodiments where dedicated contactors, such as the contactors 66 are required to be closed in order for the converter 28 to be connected to the HV battery 14, the controller 40 can also be configured to control the contactors 66, either directly, or through part of a larger control system.

Although the above illustrations have been described in terms of system hardware, and a control system used to activate and control various devices, embodiments of the present invention include a method of power management for a vehicle such as the vehicle 10. Such a method may include, for example, reducing voltage of power from a high-voltage battery during a vehicle key-off state, and charging a low-voltage battery with the reduced voltage power. The step of charging the low-voltage battery can be repeated at some predetermined frequency during the same key-off state. It may also be repeated at any time when a state of charge of the low-voltage battery drops below some predetermined charge level. In such embodiments, the SOC of the low-voltage battery can be periodically monitored to ensure that it does not drop below the predetermined charge level.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of power management for a vehicle having wheels and an electric machine operable to provide torque to drive at least one of the wheels, a high-voltage battery for providing power to the electric machine, and a low-voltage battery, the method comprising:
reducing voltage of the power from the high-voltage battery during a vehicle key-off state; and
charging the low-voltage battery with the reduced voltage power upon the occurrence of at least one predetermined event, and
wherein the at least one predetermined event includes the passing of a predetermined amount of time since the last time the low-voltage battery was charged during the same key-off state.

2. The method of claim 1, further comprising repeating the step of charging the low-voltage battery with the reduced voltage power at a predetermined frequency during the same key-off state.

3. The method of claim 1, wherein the step of charging the low-voltage battery with the reduced voltage power is performed when a state of charge of the low-voltage battery is below a predetermined state of charge during the key-off state.

4. The method of claim 3, further comprising monitoring the state of charge of the low-voltage battery at a predetermined frequency during the key-off state.

5. A method of power management for a wheeled vehicle having high- and low-voltage batteries and an electric machine operable to propel the vehicle, comprising:
operating a converter to reduce the voltage of power received from the high-voltage battery and charge the low-voltage battery when the vehicle is in a key-off state; and
closing contactors with the converter to connect the high-voltage battery to the electric machine.

6. The method of claim 5, further comprising using the converter to reduce the voltage of power received from the high-voltage battery and charge the low-voltage battery at a predetermined frequency during the key-off state.

7. The method of claim 5, wherein operating the converter to reduce the voltage of power received from the high-voltage battery and charge the low-voltage battery when the vehicle is in a key-off state is performed when a state of charge of the low-voltage battery is below a predetermined state of charge during the key-off state.

8. The method of claim 7, further comprising monitoring the state of charge of the low-voltage battery at a predetermined frequency during the key-off state.

9. The method of claim 5, wherein operating the converter to reduce the voltage of power received from the high-voltage battery and charge the low-voltage battery when the vehicle is in a key-off state is performed upon occurrence of at least one predetermined event.

10. The method of claim 9, wherein the at least one predetermined event includes the passing of a predetermined amount of time since the last time the low-voltage battery was charged by the converter during the key-off state.

11. A method of power management for a wheeled vehicle having high- and low-voltage batteries and an electric machine operable to propel the vehicle, comprising:
reducing voltage of power received from the high-voltage battery with a converter when the vehicle is in a key-off state;
charging the low-voltage battery with the reduced-voltage power when the vehicle is in the key-off state; and
closing contactors with the converter to connect the high-voltage battery to the electric machine.

12. The method of claim 11, wherein reducing the voltage of power received from the high-voltage battery with the converter and charging the low-voltage battery with the reduced-voltage power when the vehicle is in a key-off state is performed upon occurrence of at least one predetermined event.

13. The method of claim 12, wherein the at least one predetermined event includes the passing of a predetermined amount of time since the last time the low-voltage battery was charged by the converter during the key-off state.

14. The method of claim 11, wherein reducing the voltage of power received from the high-voltage battery with the converter and charging the low-voltage battery with the reduced-voltage power when the vehicle is in a key-off state is performed when a state of charge of the low-voltage battery is below a predetermined state of charge during the key-off state.

15. The method of claim 14, further comprising monitoring the state of charge of the low-voltage battery at a predetermined frequency during the key-off state.

16. The method of claim 11, further comprising using the converter to reduce the voltage of power received from the high-voltage battery and charge the low-voltage battery at a predetermined frequency during the key-off state.

* * * * *